United States Patent
Nie et al.

(10) Patent No.: US 9,397,821 B2
(45) Date of Patent: Jul. 19, 2016

(54) METHOD, APPARATUS, MOBILE COMMUNICATION TERMINAL, COMPUTER PROGRAM AND STORAGE MEDIUM FOR ADJUSTING FREQUENCY ERROR OF TERMINAL

(71) Applicant: ST-Ericsson SA, Plan-les-Ouates (CH)

(72) Inventors: Jian Nie, Beijing (CN); Jishui Li, Beijing (CN); Wei Liu, Beijing (CN)

(73) Assignee: ST-ERICSSON SA, Plan-les-Ouates (CH)

( * ) Notice: Subject to any disclaimer, the term of this patent is extended or adjusted under 35 U.S.C. 154(b) by 0 days.

(21) Appl. No.: 14/776,941

(22) PCT Filed: Apr. 17, 2013

(86) PCT No.: PCT/CN2013/074307
§ 371 (c)(1),
(2) Date: Sep. 15, 2015

(87) PCT Pub. No.: WO2014/169446
PCT Pub. Date: Oct. 23, 2014

(65) Prior Publication Data
US 2016/0050064 A1   Feb. 18, 2016

(51) Int. Cl.
*H04L 27/14* (2006.01)
*H04L 27/16* (2006.01)
(Continued)

(52) U.S. Cl.
CPC ............... *H04L 7/0016* (2013.01); *H04L 7/02* (2013.01); *H04L 27/2657* (2013.01); *H04W 88/06* (2013.01)

(58) Field of Classification Search
CPC ..... H04L 7/0016; H04L 7/02; H04L 27/0014; H04L 27/2657; H04W 88/06; H04B 7/10; H04B 1/1027

USPC ................. 375/324–327, 222, 219; 455/255; 342/357.51
See application file for complete search history.

(56) References Cited

U.S. PATENT DOCUMENTS

| 4,186,347 | A | * | 1/1980 | Frosch | ..................... | H04B 7/10 |
| | | | | | | 375/324 |
| 2005/0079846 | A1 | * | 4/2005 | Sendonaris | ......... | H04L 27/0014 |
| | | | | | | 455/255 |

(Continued)

FOREIGN PATENT DOCUMENTS

| CN | 101399794 A | 4/2009 |
| CN | 101826850 A | 9/2010 |

(Continued)

OTHER PUBLICATIONS

International Search Report issued in corresponding International application No. PCT/CN2013/074307, date of completion of the International search Dec. 16, 2013.

(Continued)

*Primary Examiner* — Phuong Phu
(74) *Attorney, Agent, or Firm* — Patent Portfolio Builders PLLC

(57) ABSTRACT

Handling a frequency error (FEQ) of a terminal which includes a plurality of modems using a same clock source includes: obtaining the FEQ, which is a difference between a carrier frequency of a received signal and a nominal frequency for each modem; obtaining a FEQ threshold of the received signal in a current service based on the FEQ; obtaining an adjusted value of the clock source corresponding to each modem based on the FEQ and the FEQ threshold; obtaining a synthesized adjusted value of the clock source based on the adjusted values of all the modems; and adjusting the frequency of the clock source based on the synthesized adjusted value of the clock source. The FEQ of the mobile communication terminal can be quickly corrected by adjusting the clock source's frequency, and, by considering the FEQ of all the modems, the modems' performances may be balanced.

16 Claims, 5 Drawing Sheets

(51) Int. Cl.
*H04L 27/22* (2006.01)
*H04L 7/00* (2006.01)
*H04L 27/26* (2006.01)
*H04L 7/02* (2006.01)
*H04W 88/06* (2009.01)

(56) References Cited

U.S. PATENT DOCUMENTS

2009/0109087 A1* 4/2009 Gronemeyer ........... G01S 19/13
　　　　　　　　　　　　　　　　　　　　　342/357.51
2012/0218017 A1* 8/2012 Roy ..................... H04B 1/1027
　　　　　　　　　　　　　　　　　　　　　327/172
2013/0202069 A1* 8/2013 Nilsson ............... H04L 27/2657
　　　　　　　　　　　　　　　　　　　　　375/343

FOREIGN PATENT DOCUMENTS

CN　　　102045082 A　　5/2011
CN　　　102098250 A　　6/2011

OTHER PUBLICATIONS

Written Opinion of the International Searching Authority issued in corresponding International application No. PCT/CN2013/074307, date of completion of the opinion Jan. 10, 2013.

* cited by examiner

| | SERVICE TYPE | | FREQUENCY ERROR THRESHOLD | |
|---|---|---|---|---|
| | | SNR | UPPER LIMIT | LOWER LIMIT |
| COMMU-NICATION STANDARD | Service 1 | $SNR_1$ | $\Delta f_{111}$ | $-\Delta f_{111}$ |
| | | $SNR_2$ | $\Delta f_{112}$ | $-\Delta f_{112}$ |
| | | ... | ... | ... |
| | | $SNR_n$ | $\Delta f_{11n}$ | $-\Delta f_{11n}$ |
| | ... | ... | ... | ... |
| | Service n | $SNR_1$ | $\Delta f_{1n1}$ | $-\Delta f_{1n1}$ |
| | | $SNR_2$ | $\Delta f_{1n2}$ | $-\Delta f_{1n2}$ |
| | | ... | ... | ... |
| | | $SNR_n$ | $\Delta f_{1nn}$ | $-\Delta f_{1nn}$ |
| ... | ... | ... | ... | ... |

FIG. 4

| FREQUENCY ERROR(Hz) | INCREMENT OF THE CONTROLLED VALUE OF THE CLOCK SOURCE |
|---|---|
| $\Delta f_1$ | $value_1$ |
| ... | ... |
| $\Delta f_n$ | $value_n$ |

FIG. 5

METHOD, APPARATUS, MOBILE COMMUNICATION TERMINAL, COMPUTER PROGRAM AND STORAGE MEDIUM FOR ADJUSTING FREQUENCY ERROR OF TERMINAL

BACKGROUND OF THE INVENTION

1. Field of the Invention

This invention relates to a communication field, and more particularly to a method, apparatus, mobile communication terminal, computer program and storage medium for adjusting frequency error of a terminal.

2. Description of the Prior Art

Dual-SIM-Dual-Call (DSDC) is a new feature of current mobile communication terminals, which enables end users to use two different network operator's services with two SIM (Subscriber Identity Module) cards. A mobile communication terminal with DSDC feature can support two SIM cards from different operators and keep camping on the network and standby. Moreover, differing from the Dual-SIM-Dual-Standby (DSDS) technology, DSDC is able to originate or receive services from the two camped networks simultaneously. That is to say, one SIM card in a call will not impact on another SIM card browsing Internet or answering another call.

Due to the fact that different operators often use different 3G ($3^{rd}$-Generation) radio access technologies, it is impossible for a single SIM card to support a mobile communication terminal to use another operator's service if the end user does not change the mobile communication terminal number. So this market demand makes that the mobile communication terminal with DSDC feature is strongly recommended by some operators and also very popular among end users.

So far there are two main structures for the mobile communication terminal with DSDC feature:

One is that there are two modem systems with different clock sources in the mobile communication terminal. Such a structure is very easy to be realized, but also in high cost.

Another one is that there are two modem systems in the mobile communication terminal, but these two modem systems use a same clock source (referring to FIG. 1), which is in low cost. These two modem systems may correct frequency error by correcting their PLL (Phase Locked Loop), but it needs a long response time. Sometimes such long response time may affea the performance of the mobile communication terminal seriously and even lead to call failure.

Thus, a method for quickly correcting the frequency error of the mobile communication terminal is desired.

SUMMARY OF THE INVENTION

The embodiments of the present invention disclose a method, apparatus, mobile communication terminal, computer program and storage medium for adjusting the frequency error of the terminal to solve the problem of being unable to quickly correcting the frequency error of the mobile communication terminal in prior art.

In some embodiments of the present invention, a method for adjusting frequency error of a terminal is provided; wherein the terminal comprises a plurality of modems using a same clock source, the method comprises:

obtaining the frequency error of a received signal of each of the plurality of modems, wherein the frequency error is a difference between a carrier frequency of the received signal and a nominal frequency;

obtaining a frequency error threshold of the received signal in a current service based on the frequency error;

obtaining a adjusted value of the clock source corresponding to each modem based on the frequency error and the frequency error threshold;

obtaining a synthesized adjusted value of the clock source based on the adjusted values of the clock source of all the modems; and adjusting the frequency of the clock source based on the synthesized adjusted value of the clock source.

Preferably, the step of obtaining the frequency error threshold of the received signal in the current service based on the frequency error comprises:

obtaining a simulation SNR (Signal to Noise Ratio) corresponding to the frequency error;

obtaining a real SNR of the received signal;

obtaining an interference SNR of the received signal based on the simulation SNR and the real SNR, wherein the interference SNR is the SNR corresponding to all other interference effect except the frequency error;

obtaining the SNR corresponding to the frequency error capable of being tolerable by the modem in the current service based on the interference SNR and the SNR threshold of the received signal in the current service; and obtaining the frequency error threshold of the received signal in the current service based on the SNR corresponding to the frequency error capable of being tolerable by the modem in the current service.

Preferably, there is a further step before the step of obtaining the simulation SNR corresponding to the frequency error, and the further step comprises: obtaining the simulation SNR and the frequency error threshold of the received signal when all the modems execute the predetermined services in corresponding communication standards based on the system simulation, and thus obtaining a corresponding relationship table of the simulation SNR and the frequency error threshold;

the step of obtaining the simulation SNR corresponding to the frequency error comprises: querying the corresponding relationship table based on the frequency error to obtain the simulation SNR corresponding to the frequency error; and the step of obtaining the frequency error threshold of the received signal in the current service based on the SNR corresponding to the frequency error capable of being tolerable by the modem in the current service comprises: querying the corresponding relationship table based on the SNR corresponding to the frequency error capable of being tolerable by the modem in the current service, to obtain the frequency error threshold corresponding to the SNR corresponding to the frequency error capable of being tolerable by the modem in the current service as the frequency error threshold of the received signal.

Preferably, the interference SNR of the received signal may be obtained by the following equation:

$$\frac{1}{SNR_{interfrence}} + \frac{1}{SNR_{FE}} = \frac{1}{SNR_{real}}$$

wherein $SNR_{interfrence}$ is the interference SNR, $SNR_{FE}$ is the simulation SNR, and $SNR_{real}$ is the real SNR.

Preferably, the SNR corresponding to the frequency error capable of being tolerable by the modem in the current service may be obtained by the following equation:

$$\frac{1}{SNR_{interfrence}} + \frac{1}{SNR_{FE\_required}} = \frac{1}{SNR_{target}}$$

wherein $SNR_{interfrence}$ is the interference SNR, $SNR_{FE\_required}$ is the SNR corresponding to the frequency error capable of being tolerable by the modem in the current service, and the $SNR_{target}$ is the SNR threshold of the received signal in the current service.

Preferably, the synthesized adjusted value of the clock source may be obtained by the following equation:

$$ADJ_i = \left\{ \frac{-\Delta f_p - \Delta f_i}{R_i}, \frac{\Delta f_p - \Delta f_i}{R_i} \right\} = \{g, h\}$$

$$Average_i = \frac{g+h}{2}$$

$$ADJ_{value} = \alpha_1 \times Average_1 + \ldots \alpha_i \times Average_i + \ldots + \alpha_n Average_n$$

wherein $ADJ_i$ is a range of the adjusted value of the clock source corresponding to the ith modem, $\Delta f_i$ is the frequency error of the received signal of the ith modem, $(-\Delta f_p, \Delta f_p)$ is the frequency error threshold of the received signal of the ith modem, $Average_i$ is the adjusted value of the clock source corresponding to the ith modem, $R_i$ is a frequency ratio between the carrier frequency of the received signal and the frequency of clock source of the ith modem, $ADJ_{value}$ is the synthesized adjusted value of the source clock, $\alpha_i$ is the weight corresponding to the ith modem, and $\alpha_i$ is greater than 0 and less than 1, $\alpha_1 + \ldots + \alpha_i + \ldots + \alpha_n = 1$, and n is a number of the modems.

Preferably, the step of adjusting the frequency of the clock source based on the synthesized adjusted value of the clock source comprises:

adjusting the frequency of the clock source by using the synthesized adjusted value of the clock source when the synthesized adjusted value of the clock source falls in the range of the adjusted values of the clock source corresponding to all the modems;

selecting the adjusted value of the clock source based on the following conditions when the synthesized adjusted value of the clock source does not fall in the range of the adjusted values of the clock source corresponding to all the modems:

when one of the modems is in service and the other modems are not in service, adjusting the frequency of the clock source based on the frequency error threshold of the modem being in service;

when one of the modems is in CS (Circuit Switching) service and the other modems are in PS (Packet Switching) service or not in service, adjusting the frequency of the clock source based on the frequency error threshold of the modem being in CS service;

when all the modems are all in CS service or PS service, adjusting the frequency of the clock source based on the frequency error threshold of the modem selected by a user.

In some embodiments of the present invention, an apparatus for adjusting frequency error of a terminal is provided, wherein the terminal comprises a plurality of modems using a same clock source, the apparatus comprises:

a frequency error obtaining module, being configured for obtaining the frequency error of a received signal of each of the plurality of modems, wherein the frequency error is the difference between a carrier frequency of the received signal and a nominal frequency;

a frequency error threshold obtaining module, being configured for obtaining a frequency error threshold of the received signal in a current service based on the frequency error;

a first adjusted value of clock source obtaining module, being configured for obtaining an adjusted value of the clock source corresponding to each modem based on the frequency error and the frequency error threshold;

a second adjusted value of clock source obtaining module, being configured for obtaining a synthesized adjusted value of the clock source based on the adjusted values of the clock source of all the modems; and a frequency adjusting module, being configured for adjusting the frequency of the clock source based on the synthesized adjusted value of the clock source.

Preferably, the frequency error threshold obtaining module comprises:

a simulation SNR Obtaining sub-module, being configured for obtaining a simulation SNR (Signal to Noise Ratio) corresponding to the frequency error;

a real SNR obtaining sub-module, being configured for obtaining a real SNR of the received signal;

an interference SNR obtaining sub-module, being configured for obtaining an interference SNR of the received signal based on the simulation SNR and the real SNR, wherein the interference SNR is the SNR corresponding to all other interference effect except the frequency error;

a first obtaining sub-module, being configured for obtaining the SNR corresponding to the frequency error capable of being tolerable by the modem in the current service based on the interference SNR and the SNR threshold of the received signal in the current service; and a second obtaining sub-module, being configured for obtaining the frequency error threshold of the received signal in the current service based on the SNR corresponding to the frequency error capable of being tolerable by the modem in the current service.

Preferably, the apparatus for adjusting the frequency error of the terminal further comprises:

a relationship table generating module, being configured for obtaining the simulation SNR and the frequency error threshold of the received signal when all the modems execute the predetermined services in corresponding communication standards based on a system simulation, and thus obtaining a corresponding relationship table of the simulation SNR and the frequency error threshold;

the simulation SNR obtaining sub-module is further configured for querying the corresponding relationship table based on the frequency error to obtain the simulation SNR corresponding to the frequency error; and the second obtaining sub-module is further configured for querying the corresponding relationship table based on the SNR corresponding to the frequency error capable of being tolerable by the modem in the current service, to obtain the frequency error threshold corresponding to the SNR corresponding to the frequency error capable of being tolerable by the modem in the current service as the frequency error threshold of the received signal.

Preferably, the interference SNR of the received signal may be obtained by the following equation:

$$\frac{1}{SNR_{interfrence}} + \frac{1}{SNR_{FE}} = \frac{1}{SNR_{real}}$$

wherein $SNR_{interfrence}$ is the interference SNR, $SNR_{FE}$ is the simulation SNR, and $SNR_{real}$ is the real SNR.

Preferably, the SNR corresponding to the frequency error capable of being tolerable by the modem in the current service may be obtained by the following equation:

$$\frac{1}{SNR_{interfrence}} + \frac{1}{SNR_{FE\_required}} = \frac{1}{SNR_{target}}$$

wherein $SNR_{interfrence}$ is the interference SNR, $SNR_{FE\_required}$ is the SNR corresponding to the frequency error capable of being tolerable by the modem in the current service, and the $SNR_{target}$ is the SNR threshold of the received signal in the current service.

Preferably, the synthesized adjusted value of the clock source may be obtained by the following equation:

$$ADJ_i = \left\{ \frac{-\Delta f_p - \Delta f_i}{R_i}, \frac{\Delta f_p - \Delta f_i}{R_i} \right\} = \{g, h\}$$

$$Average_i = \frac{g+h}{2}$$

$$ADJ_{value} = \alpha_1 \times Average_1 + \ldots \alpha_i \times Average_i + \ldots + \alpha_n Average_n$$

wherein $ADJ_i$ is a range of the adjusted value of the dock source corresponding to the ith modem, $\Delta f_i$ is the frequency error of the received signal of the ith modem, $(-\Delta f_p, \Delta f_p)$ is the frequency error threshold of the received signal of the ith modem, $Average_i$ is the adjusted value of the clock source corresponding to the ith modem, $R_i$ is a frequency ratio between the carrier frequency of the received signal and the frequency of clock source of the ith modem, $ADJ_{value}$ is the synthesized adjusted value of the source clock, $\alpha_i$ is the weight corresponding to the ith modem, and $\alpha_i$ is greater than 0 and less than 1, $\alpha_1 + \ldots + \alpha_i + \ldots + \alpha_n = 1$, and n is a number of the modems.

Preferably, the frequency adjusting module comprises:

a first adjusting sub-module, being configured for adjusting the frequency of the clock source by using the synthesized adjusted value of the clock source when the synthesized adjusted value of the clock source falls in a range of the adjusted values of the clock source corresponding to all the modems;

a second adjusting sub-module, being configured for performing the following operations when the synthesized adjusted value of the clock source does not fall in the range of the adjusted values of the clock source corresponding to all the modems:

when one of the modems is in service and the other modems are not in service, adjusting the frequency of the clock source based on the frequency error threshold of the modem being in service;

when one of the modems is in CS (Circuit Switching) service and the other modems are in PS (Packet Switching) service or not in service, adjusting the frequency of the clock source based on the frequency error threshold of the modem being in CS service;

when all the modems are all in CS service or PS service, adjusting the frequency of the clock source based on the frequency error threshold of the modem selected by a user.

In some embodiments of the present invention, the mobile communication terminal is further provided, which comprises the apparatus for adjusting the frequency error of the terminal.

In some embodiments of the present invention, the computer program is further provided, which is used to implement the method for adjusting the frequency error of the terminal.

In some embodiments of the present invention, a storage medium is further provided, which is used to store the computer program.

Naturally, the present invention is not limited to the above features and advantages. In fact, many other Features and advantages are obvious for those skilled in the art under the teaching of the following description and drawings.

BRIEF DESCRIPTION OF THE DRAWINGS

FIG. 4 is a corresponding relationship table for the frequency error threshold and a signal to noise ratio (SNR) according to the embodiments of the present invention;

FIG. 5 is a corresponding relationship table for the frequency error and a control value of a clock source according to the embodiments of the present invention.

DETAILED DESCRIPTION OF THE PREFERRED EMBODIMENTS

The First Embodiment

Figure 1:
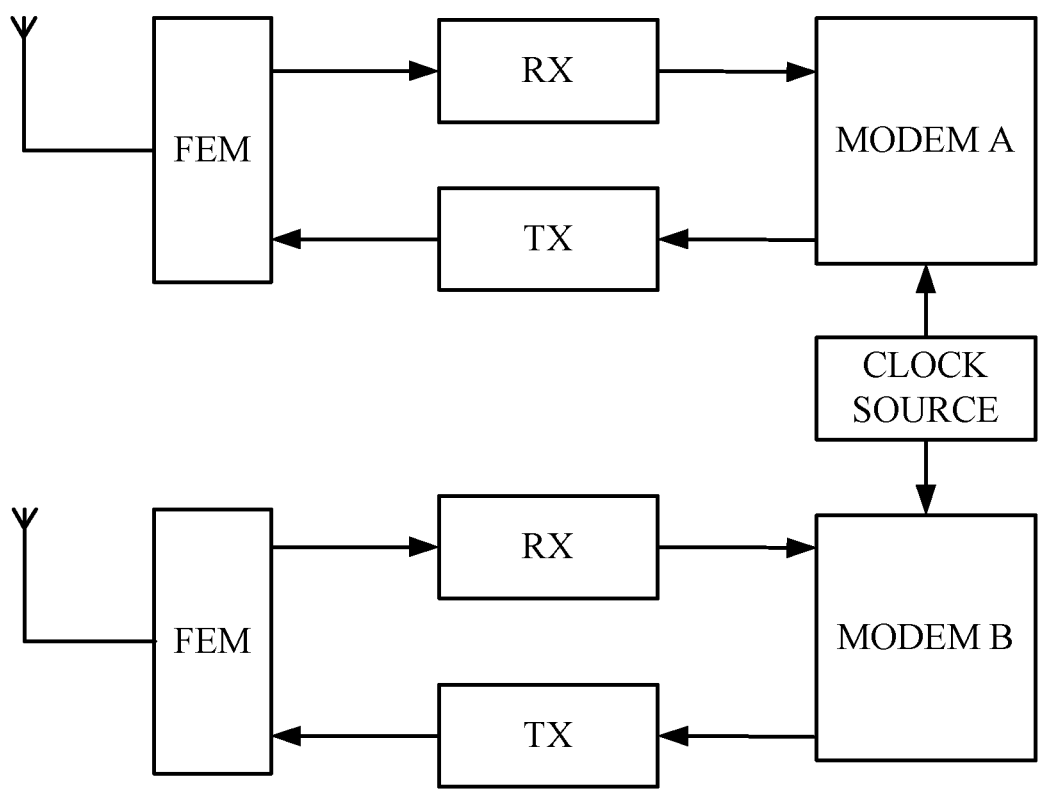
FIG. 1 is a structure schematic diagram of the mobile communication terminal in prior art.
Figure 2:
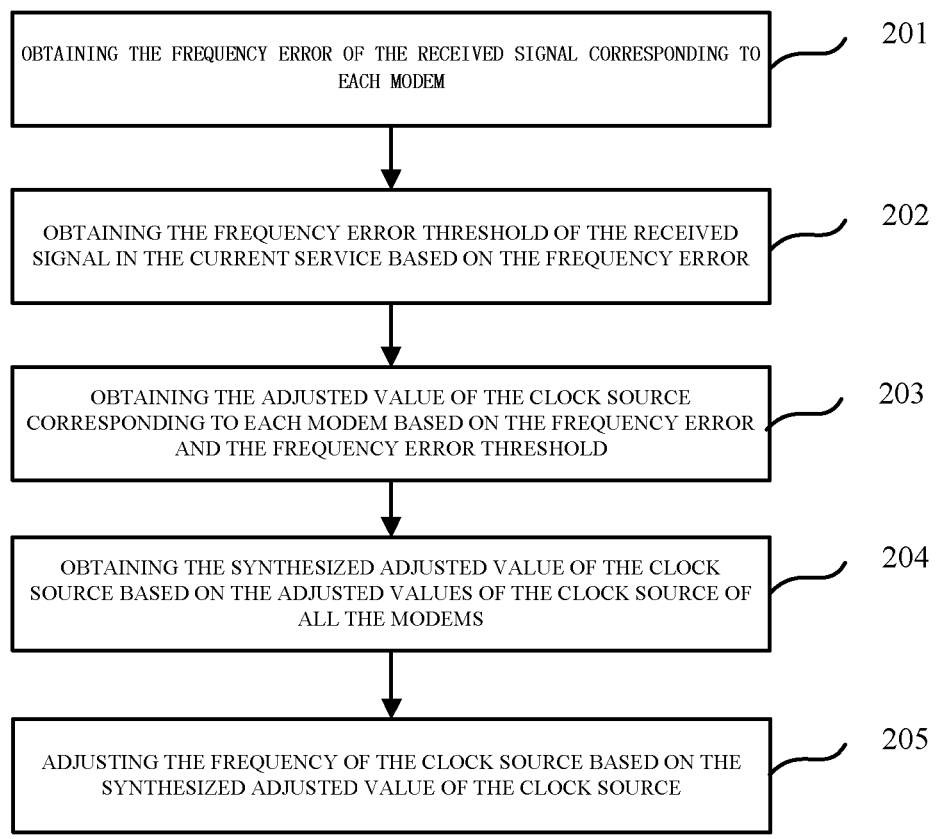
FIG. 2 is a schematic flowchart of a method for adjusting the frequency error of the terminal according to a first embodiment of the present invention.

FIG. 2 shows the schematic flowchart of the method for adjusting the frequency error of the terminal according to the first embodiment of the present invention. The terminal in the present embodiment may be a mobile communication terminal, which may include a plurality of modems using a same clock source. The method for adjusting the frequency error of the terminal may include the following steps:

Step 201: obtaining the frequency error of a received signal of each of the plurality of modems, and the frequency error may be a difference between a carrier frequency of the received signal of the modem and a nominal frequency;

Because the frequency error obtained by such calculation in this step does not consider the factor of current service of the modem, this frequency error may not be directly used for calculating the corresponding adjusted value of the clock source.

Step 202: obtaining a frequency error threshold of the received signal in the current service based on the frequency error;

Step 203: obtaining an adjusted value of the clock source corresponding to each modem based on the frequency error and the frequency error threshold;

Step 204: obtaining a synthesized adjusted value of the clock source based on the adjusted values of the clock source of all the modems;

Step 205: adjusting the frequency of the clock source based on the synthesized adjusted value of the clock source.

According to the method of the above embodiment, the frequency error of the mobile communication terminal can be quickly corrected as long as the frequency of the clock source is adjusted. Furthermore, as the frequency errors of the plurality of modems are all considered, the performances of the plurality of modems may be balanced.

In the above step 202, the frequency error threshold of the received signal of the modem in the current service can be obtained in many ways, which are illustrated as follows by example.

The Second Embodiment

According to the system simulation, the frequency error of the received signal and the SNR correspond to each other in the predetermined service. The greater the frequency error is, the lower the SNR is. In the embodiments of the present invention, the frequency error threshold of the received signal in the predetermined service may be obtained by means of the above correspondence.

Furthermore, in the embodiments of the present invention, the interference of the received single may be divided into two parts, one of which is the frequency error effect, and the other one of which is all other interference effect. In the embodiments of the present invention, the SNR corresponding to all other interference effect may be calculated first, and then the SNR corresponding to the frequency error capable of being tolerable by the received signal may be calculated based on the SNR threshold of the received signal of the modem in the current service and the SNR corresponding to an other interference effect obtained by calculation, thus the frequency error threshold of the received signal is obtained.

Figure 3:
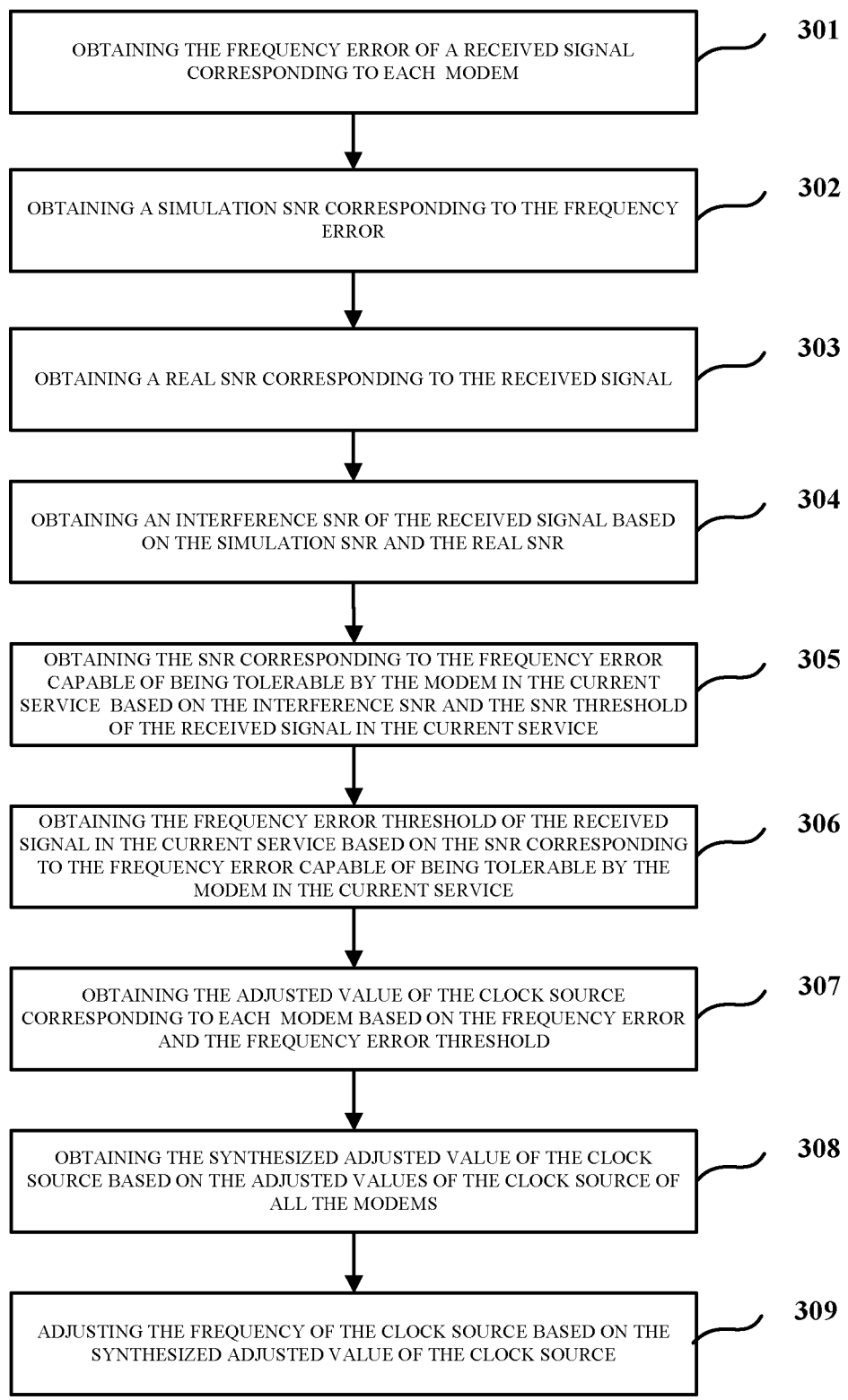
FIG. 3 is a schematic flowchart of a method for adjusting the frequency error of the terminal according to a second embodiment of the present invention.

FIG. 3 shows the schematic flowchart of the method for adjusting the frequency error of the terminal according to the second embodiment of the present invention. The terminal in the present embodiment may be a mobile communication terminal, which may include a plurality of modems using the same clock source. The method for adjusting the frequency error of the terminal may include the following steps:

Step 301: obtaining the frequency error of a received signal of each of the plurality of modems, and the frequency error may be a difference between a carrier frequency of the received signal of the modem and a nominal frequency;

Step 302: obtaining a simulation SNR corresponding to the frequency error;

Step 303: obtaining a real SNR corresponding to the received signal;

Step 304: obtaining an interference SNR of the received signal based on the simulation SNR and the real SNR, and the interference SNR may be the SNR corresponding to all other interference effect except the frequency error;

The interference SNR of the received signal may be obtained by the following equation:

$$\frac{1}{SNR_{interfrence}} + \frac{1}{SNR_{FE}} = \frac{1}{SNR_{real}}$$

Wherein $SNR_{interfrence}$ is the interference SNR, $SNR_{FE}$ is the simulation SNR, and $SNR_{real}$ is the real SNR.

Step 305: obtaining the SNR corresponding to the frequency error capable of being tolerable by the modem in the current service based on the interference SNR and the SNR threshold of the received signal in the current service;

The SNR corresponding to the frequency error capable of being tolerable by the modem in the current service may be obtained by the following equation:

$$\frac{1}{SNR_{interfrence}} + \frac{1}{SNR_{FE\_required}} = \frac{1}{SNR_{target}}$$

Wherein $SNR_{interfrence}$ is the interference SNR, $SNR_{FE\_required}$ is the SNR corresponding to the frequency error capable of being tolerable by the modem in the current service, and $SNR_{target}$ is the SNR threshold of the received signal in the current service.

Step 306: obtaining the frequency error threshold of the received signal in the current service based on the SNR corresponding to the frequency error capable of being tolerable by the modem in the current service;

Step 307: obtaining the adjusted value of the clock source corresponding to each of the plurality of modems based on the frequency error and the frequency error threshold;

The adjusted value of the clock source corresponding to the modem may be obtained by the following equation:

$$ADJ_i = \left\{ \frac{-\Delta f_p - \Delta f_i}{R_i}, \frac{\Delta f_p - \Delta f_i}{R_i} \right\} = \{g, h\}$$

$$Average_i = \frac{g+h}{2}$$

Wherein $ADJ_i$ is a range of the adjusted value of the clock source corresponding to the ith modem, $\Delta f_i$ is the frequency error of the received signal of the ith modem, $(-\Delta f_p, \Delta f_p)$ is the frequency error threshold of the received signal of the ith modem, $Average_i$ is the adjusted value of the clock source corresponding to the ith modem, and $R_i$ is the frequency ratio between the carrier frequency of the received signal and the frequency of clock source of the ith modem.

Step 308: obtaining a synthesized adjusted value of the clock source based on the adjusted values of the clock source of all the modems;

The synthesized adjusted value of the clock source may be obtained by the following equation:

$$ADJ_{value} = \alpha_i \times Average_1 + \ldots \alpha_i \times Average_i + \ldots + \alpha_n Average_n$$

Wherein $ADJ_{value}$ is the synthesized adjusted value of the source clock, $Average_i$ is the adjusted value of the clock source corresponding to the ith modem, $\alpha_i$ is a weight corresponding to the ith modem, and $\alpha_i$ is greater than 0 and less than 1, $\alpha_1 + \ldots + \alpha_i + \ldots + a_n = 1$, and n is a number of the modems.

Wherein the weight corresponding to each modem may be set as required, and it may be assumed that the terminal includes two modems, and the weigh corresponding to each of the modems may be 0.5, or it may be assumed that one of the modems is more important and the weight thereof may be set to 0.6 and the weight of the other modem may be set to 0.4.

Step 309: adjusting the frequency of the clock source based on the synthesized adjusted value of the clock source.

Naturally, the simulation SNR in the above step 302 may be obtained by a system simulation, thus the following steps may be added before the step 302: obtaining the simulation SNR and the frequency error threshold of the received signal when all the modems execute the predetermined services in corresponding communication standards based on the system simulation, and thus obtaining the corresponding relationship table of the simulation SNR and the frequency error threshold. FIG. 4 shows an example of such corresponding relationship table. In FIG. 4, the communication standard may include TD-SCDMA (Time Division-Synchronous Code Division Multiple Access), WCDMA (Wideband Code Division Multiple Access), and so on, and the service may include CS (Circuit Switching) service, PS (Packet Switching) service, and so on.

In this regard, the step 302 may be embodied as follows: querying the corresponding relationship table based on the frequency error to obtain the simulation SNR corresponding to the frequency error.

The step 305 may be embodied as follows: querying the corresponding relationship table based on the SNR corresponding to the frequency error capable of being tolerable by the modem in the current service, to obtain the frequency error threshold corresponding to the SNR corresponding to the frequency error capable of being tolerable by the modem in the current service as the frequency error threshold of the received signal, According to the method of the above embodiment, the frequency error threshold of the received signal of the modem in the current service can be quickly obtained by querying the corresponding relationship table of the frequency error threshold and the SNR which may be obtained by simulation in advance, thus the efficiency for correcting the frequency error of the mobile communication terminal can be further improved.

There are two cases for the synthesized adjusted value of the clock source in the above embodiment:

Case 1: the synthesized adjusted value of the clock source falls in the range of the adjusted values of the clock source corresponding to all the modems. In this case, the frequency of the clock source may be adjusted based on the synthesized adjusted value of the clock source.

Case 2: the synthesized adjusted value of the clock source does not fall in the range of the adjusted values of the clock source corresponding to all the modems. In this case, the following steps may be carried out:

When one of the modems is in service and the other modems are not in service (for example, in idle or in registering mode), the frequency of the clock source may be adjusted based on the frequency error threshold of the modem being in service;

When one of the modems is in CS service and the other modems are in PS service or not in service, the frequency of the clock source may be adjusted based on the frequency error threshold of the modem being in CS service;

When all the modems are all in CS service or PS service, the frequency of the clock source may be adjusted based on the frequency error threshold of the modem selected by a user.

Because such steps consider the current service of the modem and the user's selection, the correction result of the frequency error of the terminal is more accurate.

The Third Embodiment

In the following, for example, it is assumed that the terminal for carrying out the method of adjusting the frequency error of the terminal is a mobile communication terminal including two modems to specifically describe the method of adjusting the frequency error of the terminal It should be noted that the two modems in the present embodiment (modem A and modem B) may work at the same time and use a same clock source, each of the two modems may support CS service and PS service, and the mobile communication terminal is also called a DSDC terminal.

(1) Firstly, the adjusted values of the clock source corresponding to modem A and modem B may be calculated.

For Modem A:

1) Obtaining the frequency error of the received signal corresponding to modem A, wherein the frequency error is the difference between the carrier frequency of the received signal corresponding to modem A and the nominal frequency;

2) Querying the table as shown in FIG. 4 to obtain the simulation SNR corresponding to the frequency error;

3) Obtaining the real SNR of the received signal corresponding to modem A;

4) Obtaining the interference SNR of the received signal corresponding to modem A based on the simulation SNR and the real SNR, wherein the interference SNR is the SNR corresponding to all other interference effect excepting the frequency error;

The interference SNR of the received signal may be obtained by the following equation:

$$\frac{1}{SNR_{interfrence}} + \frac{1}{SNR_{FE}} = \frac{1}{SNR_{real}}$$

Wherein $SNR_{interfrence}$ is the interference SNR, $SNR_{FE}$ is the simulation SNR, and $SNR_{real}$ is the real SNR.

5) Obtaining the SNR corresponding to the frequency error capable of being tolerable by modem A in the current service based on the interference SNR and the SNR threshold of the received signal in the current service;

The SNR corresponding to the frequency error capable of being tolerable by modem A in the current service may be obtained by the following equation:

$$\frac{1}{SNR_{interfrence}} + \frac{1}{SNR_{FE\_required}} = \frac{1}{SNR_{target}}$$

Wherein $SNR_{interfrence}$ is the interference SNR, $SNR_{FE\_required}$ is the SNR corresponding to the frequency error capable of being tolerable by modem A in the current service, and $SNR_{target}$ is the SNR threshold of the received signal in the current service. As the current service of modem A is known, the SNR threshold of the current service may be obtained by querying 3GPP (the $3^{rd}$ Generation Partner Project) standard.

6) Querying the table as shown in FIG. 4 based on the SNR corresponding to the frequency error capable of being tolerable by modem A in the current service to obtain the frequency error threshold $Range_A$ of the received signal in the current service, and it is assumed that the range of $Range_A$ is $(-\Delta f_A, \Delta f_A)$;

7) Obtaining the adjusted value of the clock source corresponding to modem A based on the frequency error and the frequency error threshold of modem A;

Wherein the adjusted value of the clock source corresponding to modem A may be as follows:

$$ADJ_A = \left\{ \frac{-\Delta f_A - \Delta f_{AC}}{R_A}, \frac{\Delta f_A - \Delta f_{AC}}{R_A} \right\} = \{a, b\}$$

$$Average_A = \frac{a+b}{2}$$

Wherein $ADJ_A$ is the range of the adjusted value of the clock source corresponding to modem A, $\Delta f_{AC}$ is the frequency error of the received signal of modem A, $(-\Delta f_A, \Delta f_A)$ is the frequency error threshold of the received signal of modem A, $Average_A$ is the adjusted value of the clock source corresponding to modem A, and $R_A$ is a frequency ratio between the carrier frequency of the received signal and the frequency of clock source of modem A.

For Modem B:

1) Obtaining the frequency error of the received signal corresponding to modem B, wherein the frequency error is the difference between the carrier frequency of the received signal corresponding to modem B and the nominal frequency;

2) Querying the table as shown in FIG. 4 to obtain the simulation SNR corresponding to the frequency error;

3) Obtaining the real SNR of the received signal corresponding to modem B;

4) Obtaining the interference SNR of the received signal corresponding to modem B based on the simulation SNR and the real SNR, wherein the interference SNR is the SNR corresponding to all other interference effect excepting the frequency error;

The interference SNR of the received signal may be obtained by the following equation:

$$\frac{1}{SNR_{interfrence}} + \frac{1}{SNR_{FE}} = \frac{1}{SNR_{real}}$$

Wherein, $SNR_{interfrence}$ e interference SNR, $SNR_{FE}$ is the simulation SNR, and $SNR_{real}$ is the real SNR, 5) Obtaining the SNR corresponding to the frequency error capable of being tolerable by modem B in the current service based on the interference SNR and the SNR threshold of the received signal in the current service;

The SNR corresponding to the frequency error capable of being tolerable by modem B in the current service may be obtained by the following equation:

$$\frac{1}{SNR_{interfrence}} + \frac{1}{SNR_{FE\_required}} = \frac{1}{SNR_{target}}$$

Wherein $SNR_{interfrence}$ is the interference SNR, $SNR_{FE\_required}$ is the SNR corresponding to the frequency error capable of being tolerable by modem B in the current service, and $SNR_{target}$ is the SNR threshold of the received signal in the current service. As the current service of modem B is known, the SNR threshold of the current service may be obtained by querying 3GPP standard.

6) Querying the table as shown in FIG. 4 based on the SNR corresponding to the frequency error capable of being tolerable by modem B in the current service to obtain the frequency error threshold $Range_B$ of the received signal in the current service, and it is assumed that the range of $Range_B$ is $(-\Delta f_B, \Delta f_B)$;

7) Obtaining the adjusted value of the clock source corresponding to modem B based on the frequency error and the frequency error threshold of modem B;

Wherein the adjusted value of the clock source corresponding to modem B may be as follows:

$$ADJ_B = \left\{ \frac{-\Delta f_B - \Delta f_{BC}}{R_B}, \frac{\Delta f_B - \Delta f_{BC}}{R_B} \right\} = \{c, d\}$$

$$Average_B = \frac{c+d}{2}$$

Wherein $ADJ_B$ is the range of the adjusted value of the clock source corresponding to modem B, $\Delta f_{BC}$ is the frequency error of the received signal of modem B, $(-\Delta f_B, \Delta f_B)$ is the frequency error threshold of the received signal of modem B, $Average_B$ is the adjusted value of the clock source corresponding to modem B, and $R_B$ is the frequency ratio between the carrier frequency of the received signal and the frequency of clock source of modem. B.

(3) Then, acquiring the synthesized adjusted value of the clock source based on the adjusted values of the clock source of modem A and modem B;

$$ADJ_{value} = \alpha \times Average_A + \beta \times Average_B$$

Wherein $ADJ_{value}$ is the synthesized adjusted value of the clock source, $\alpha$ is the weight corresponding to modem A, and $\beta$ is the weight corresponding to modem B.

There may exist two cases for the obtained synthesized adjusted value of the clock source:

Case 1: If $ADJ_{value} \in ADJ_A$ and $ADJ_{value} \in ADJ_B$, $ADJ_{value}$ is good for both of the modems. Therefore, the frequency of the clock source may be adjusted based on $ADJ_{value}$. More specifically, the frequency of the clock source may be adjusted based on the corresponding relationship table of the frequency error and the controlled value of the clock source as shown in FIG. 5, and the corresponding relationship table in FIG. 5 may be obtained by a system simulation.

Case 2: If $ADJ_{value} \notin ADJ_A$ and $ADJ_{value} \notin ADJ_B$, a selection should be made between two modems:

When one of the modems is in service and the other modem is not in service (for example, in idle or in registering mode), the frequency of the clock source may be adjusted based on the frequency error threshold of the modem being in service;

When one of the modems is in CS service and the other modem is in PS service or not in service, the frequency of the clock source may be adjusted based on the frequency error threshold of the modem being in CS service;

When both of the modems are both in CS service or PS service, the frequency of the clock source may be adjusted based on the frequency error threshold of the modem selected by a user.

(4) In the end, the frequency of the clock source may be adjusted based on the synthesized adjusted value of the clock source.

An embodiment of the present invention provides a computer program for implementing the method for adjusting the frequency error of the terminal.

A further embodiment of the present invention provides a storage medium for storing the computer program.

The Fourth Embodiment

Figure 6:
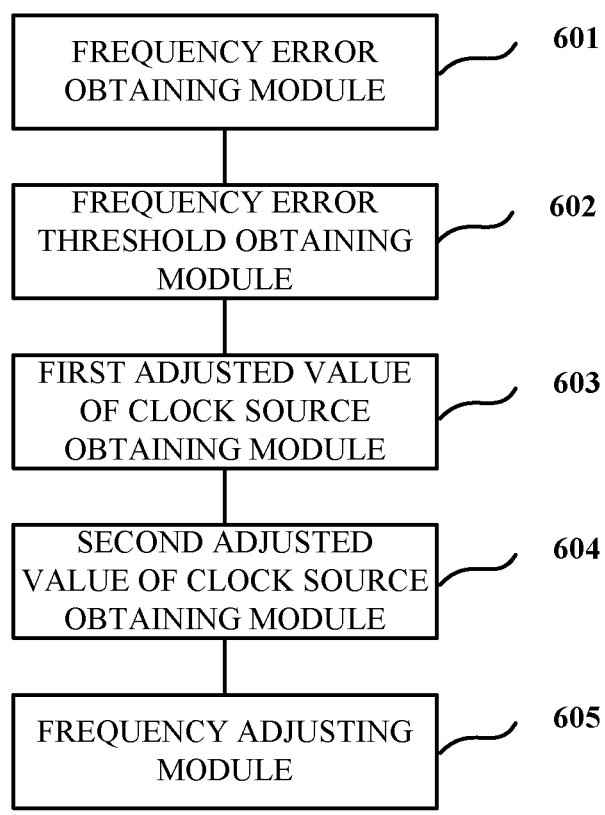
FIG. 6 is a structure block diagram of an apparatus for adjusting the frequency error of the terminal according to a fourth embodiment of the present invention.

FIG. 6 shows a structure block diagram of an apparatus for adjusting the frequency error of the terminal according to the fourth embodiment of the present invention, and the terminal includes a plurality of modems using a same clock source. The apparatus may include:

A frequency error obtaining module 601, being configured for obtaining the frequency error of a received signal of each of the plurality of modems, wherein the frequency error may be the difference between a carrier frequency of the received signal and a nominal frequency;

A frequency error threshold obtaining module 602, being configured for obtaining the frequency error threshold of the received signal in the current service based on the frequency error;

A first adjusted value of clock source obtaining module 603, being configured for obtaining the adjusted value of the clock source corresponding to each of the plurality of modems based on the frequency error and the frequency error threshold;

The adjusted value of the clock source corresponding to each modem may be obtained by the following equation:

$$ADJ_i = \left\{ \frac{-\Delta f_p - \Delta f_i}{R_i}, \frac{\Delta f_p - \Delta f_i}{R_i} \right\} = \{g, h\}$$

$$Average_i = \frac{g+h}{2}$$

Wherein $ADJ_i$ is the range of the adjusted value of the clock source corresponding to the ith modem, $\Delta f_i$ is the frequency error of the received signal of the ith modem, $(-\Delta f_p, \Delta f_p)$ is the frequency error threshold of the received signal of the ith modem, $Average_i$ is the adjusted value of the clock source corresponding to the ith modem, and $R_i$ is the frequency ratio between the carrier frequency of the received signal and the frequency of clock source of the ith modem.

A second adjusted value of clock source obtaining module 604, being configured for obtaining the synthesized adjusted value of the clock source based on the adjusted values of the clock source of all the modems;

The synthesized adjusted value of the clock source may be obtained by the following equation:

$$ADJ_{value} = \alpha_1 \times Average_1 + \ldots \alpha_i \times Average_i + \ldots + \alpha_n Average_n$$

Wherein $ADJ_{value}$ is the synthesized adjusted value of the source clock, $Average_i$ is the adjusted value of the clock source corresponding to the ith modem, $\alpha_i$ is a weight corresponding to the ith modem, and $\alpha_i$ is greater than 0 and less than 1, $\alpha_1 + \ldots + \alpha_i + \ldots + \alpha_n = 1$, and n is a number of the modems.

A frequency adjusting module 605, being configured for adjusting the frequency of the clock source based on the synthesized adjusted value of the clock source.

According to the apparatus of the above embodiment, the frequency error of the mobile communication terminal can be quickly corrected as long as the frequency of the clock source is adjusted. Furthermore, as the frequency errors of the plurality of modems are all considered, the performances of the plurality of modems may be balanced.

According to the system simulation, the frequency error of the received signal and the SNR correspond to each other in the predetermined service. The greater the frequency error is, the lower the SNR is. In the embodiment of the present invention, the frequency error threshold of the received signal in the predetermined service may be obtained by means of the above correspondence.

Specifically, the frequency error threshold obtaining module 602 may include:

A simulation SNR obtaining sub-module, being configured for Obtaining a simulation SNR corresponding to the frequency error;

A real SNR obtaining sub-module, being configured for obtaining a real SNR of the received signal;

An interference SNR obtaining sub-module, being configured for obtaining an interference SNR of the received signal based on the simulation SNR and the real SNR, wherein the interference SNR may be the SNR corresponding to all other interference effect except the frequency error;

The interference SNR of the received signal may be obtained by the following equation:

$$\frac{1}{SNR_{interfrence}} + \frac{1}{SNR_{FE}} = \frac{1}{SNR_{real}}$$

Wherein, $SNR_{interfrence}$ is the interference SNR, $SNR_{FE}$ is the simulation SNR, and $SNR_{real}$ is the real SNR.

A first obtaining sub-module, being configured for obtaining the SNR corresponding to the frequency error capable of being tolerable by the modem in the current service based on the interference SNR and the SNR threshold of the received signal in the current service;

The SNR corresponding to the frequency error capable of being tolerable by the modem in the current service may be obtained by the following equation:

$$\frac{1}{SNR_{interfrence}} + \frac{1}{SNR_{FE\_required}} = \frac{1}{SNR_{target}}$$

Wherein, $SNR_{interfrence}$ is the interference SNR, $SNR_{FE\_required}$ is the SNR corresponding to the frequency error capable of being tolerable by the modem in the current service, and the $SNR_{target}$ is the SNR threshold of the received signal in the current service.

A second obtaining sub-module, being configured for obtaining the frequency error threshold of the received signal in the current service based on the SNR corresponding to the frequency error capable of being tolerable by the modem in the current service.

The apparatus for adjusting the frequency error of the terminal may also include:

A relationship table generating module, being configured for obtaining the simulation SNR and the frequency error threshold of the received signal when all the modems execute the predetermined services in corresponding communication standards based on the system simulation, and thus obtaining the corresponding relationship table of the simulation SNR and the frequency error threshold;

Then, the simulation SNR obtaining sub-module is further configured for querying the corresponding relationship table based on the frequency error to obtain the simulation SNR corresponding to the frequency error.

The second obtaining sub-module is further configured for querying the corresponding relationship table based on the SNR corresponding to the frequency error capable of being tolerable by the modem in the current service, to obtain the frequency error threshold corresponding to the SNR corresponding to the frequency error capable of being tolerable by the modem in the current service as the frequency error threshold of the received signal.

The frequency adjusting module 605 may include:

A first adjusting sub-module, being configured for adjusting the frequency of the clock source by using the synthesized adjusted value of the clock source when the synthesized adjusted value of the clock source falls in the range of the adjusted values of the clock source corresponding to all the modems;

A second adjusting sub-module, being configured for performing the following operations when the synthesized adjusted value of the clock source does not fall in the range of the adjusted values of the clock source corresponding to ail the modems:

When one of the modems is in service and the other modems are not in service, adjusting the frequency of the clock source based on the frequency error threshold of the modem being in service;

When one of the modems is in CS service and the other modems are in PS service or not in service, adjusting the frequency of the clock source based on the frequency error threshold of the modem being in CS service; and When all the modems are all in CS service or PS service, adjusting the frequency of the clock source based on the frequency error threshold of the modem selected by a user.

A further embodiment of the present invention provides a mobile communication terminal including the apparatus for adjusting the frequency error of the terminal.

What is claimed is:

1. A method for adjusting frequency error of a terminal, wherein the terminal comprises a plurality of modems using a same clock source, the method comprising:

obtaining a frequency error of a received signal of each of the plurality of modems, wherein the frequency error is a difference between a carrier frequency of the received signal and a nominal frequency;

obtaining a frequency error threshold of the received signal in a current service based on the frequency error;

obtaining an adjusted value of the clock source corresponding to each modem based on the frequency error and the frequency error threshold;

obtaining a synthesized adjusted value of the clock source based on the adjusted values of the clock source of all the modems; and adjusting a frequency of the clock source based on the synthesized adjusted value of the clock source.

2. The method for adjusting the frequency error of the terminal according to claim 1, wherein the obtaining the frequency error threshold of the received signal in the current service based on the frequency error comprises:

obtaining a simulation Signal to Noise Ratio (SNR) corresponding to the frequency error;

obtaining a real SNR of the received signal;

obtaining an interference SNR of the received signal based on the simulation SNR and the real SNR, wherein the interference SNR is the SNR corresponding to all other interference effect except the frequency error;

obtaining the SNR corresponding to the frequency error capable of being tolerable by the modem in the current service based on the interference SNR and the SNR threshold of the received signal in the current service; and obtaining the frequency error threshold of the received signal in the current service based on the SNR corresponding to the frequency error capable of being tolerable by the modem in the current service.

3. The method for adjusting the frequency error of the terminal according to claim 2, further comprising:

before the obtaining the simulation SNR corresponding to the frequency error, obtaining the simulation SNR and the frequency error threshold of the received signal when all the modems execute the predetermined services in corresponding communication standards based on a system simulation, and thus obtaining a corresponding relationship table of the simulation SNR and the frequency error threshold, wherein the obtaining the simulation SNR corresponding to the frequency error comprises: querying the corresponding relationship table based on the frequency error to obtain the simulation SNR corresponding to the frequency error; and the obtaining the frequency error threshold of the received signal in the current service based on the SNR corresponding to the frequency error capable of being tolerable by the modem in the current service comprises:

querying the corresponding relationship table based on the SNR corresponding to the frequency error capable of being tolerable by the modem in the current service, to obtain the frequency error threshold corresponding to the SNR corresponding to the frequency error capable of being tolerable by the modem in the current service as the frequency error threshold of the received signal.

4. The method for adjusting the frequency error of the terminal according to claim 2, wherein the interference SNR of the received signal is obtained by the following equation:

$$\frac{1}{SNR_{interfrence}} + \frac{1}{SNR_{FE}} = \frac{1}{SNR_{real}}$$

wherein $SNR_{interfrence}$ is the interference SNR, $SNR_{FE}$ is the simulation SNR, and $SNR_{real}$ is the real SNR.

5. The method for adjusting the frequency error of the terminal according to claim 2, wherein the SNR corresponding to the frequency error capable of being tolerable by the modem in the current service is obtained by the following equation:

$$\frac{1}{SNR_{interfrence}} + \frac{1}{SNR_{FE\_required}} = \frac{1}{SNR_{target}}$$

wherein $SNR_{interfrence}$ is the interference SNR, $SNR_{FE\_required}$ is the SNR corresponding to the frequency error capable of being tolerable by the modem in the current service, and the $SNR_{target}$ is the SNR threshold of the received signal in the current service.

6. The method for adjusting the frequency error of the terminal according to claim 1, wherein the synthesized adjusted value of the clock source is obtained by the following equation:

$$ADJ_i = \left\{ \frac{-\Delta f_p - \Delta f_i}{R_i}, \frac{\Delta f_p - \Delta f_i}{R_i} \right\} = \{g, h\}$$

$$Average_i = \frac{g+h}{2}$$

$$ADJ_{value} = \alpha_1 \times Average_1 + \ldots \alpha_i \times Average_i + \ldots + \alpha_n Average_n$$

wherein $ADJ_i$ is a range of the adjusted value of the clock source corresponding to the ith modem, $\Delta f_i$ is the frequency error of the received signal of the ith modem, $(-\Delta f_p, \Delta f_p)$ is the frequency error threshold of the received signal of the ith modem, $Average_i$ is the adjusted value of the clock source corresponding to the ith modem, $R_i$ is a frequency ratio between the carrier frequency of the received signal and the frequency of clock source of the ith modem, $ADJ_{value}$ is the synthesized adjusted value of the source clock, $\alpha_i$ is a weight corresponding to the ith modem, and $\alpha_i$ is greater than 0 and less than 1, $\alpha_1 + \ldots + \alpha_i + \ldots + \alpha_n = 1$, and n is the number of the modems.

7. The method for adjusting the frequency error of the terminal according to claim 1, wherein the adjusting the frequency of the clock source based on the synthesized adjusted value of the clock source comprises:

adjusting the frequency of the clock source by using the synthesized adjusted value of the clock source when the synthesized adjusted value of the clock source falls in the range of the adjusted values of the clock source corresponding to all the modems;

selecting the adjusted value of the clock source based on following conditions when the synthesized adjusted value of the clock source does not fall in the range of the adjusted values of the clock source corresponding to all the modems:

adjusting the frequency of the clock source based on the frequency error threshold of the modem being in service when one of the modems is in service and the other modems are not in service;

adjusting the frequency of the clock source based on the frequency error threshold of the modem being in CS service when one of the modems is in Circuit Switching service and the other modems are in Packet Switching service or not in service;

adjusting the frequency of the clock source based on the frequency error threshold of the modem selected by a user when all the modems are in CS service or PS service.

8. An apparatus for adjusting frequency error of a terminal, wherein the terminal comprises a plurality of modems using a same clock source, the apparatus comprising:

a frequency error obtaining module, configured to obtain a frequency error of a received signal of each of the plurality of modems, wherein the frequency error is a difference between a carrier frequency of the received signal and a nominal frequency;

a frequency error threshold obtaining module, configured to obtain a frequency error threshold of the received signal in a current service based on the frequency error;

a first adjusted value of clock source obtaining module, configured to obtain an adjusted value of the clock source corresponding to each modem based on the frequency error and the frequency error threshold;

a second adjusted value of clock source obtaining module, configured to obtain a synthesized adjusted value of the clock source based on the adjusted values of the clock source of all the modems; and a frequency adjusting module, configured to adjust the frequency of the clock source based on the synthesized adjusted value of the clock source.

9. The apparatus for adjusting the frequency error of the terminal according to claim 8, wherein the frequency error threshold obtaining module comprises:

a simulation SNR obtaining sub-module, configured to obtain a simulation SNR corresponding to the frequency error;

a real SNR obtaining sub-module, configured to obtain a real SNR of the received signal;

an interference SNR obtaining sub-module, configured to obtain an interference SNR of the received signal based on the simulation SNR and the real SNR, wherein the interference SNR is the SNR corresponding to all other interference effect except the frequency error;

a first obtaining sub-module, configured to obtain the SNR corresponding to the frequency error capable of being tolerable by the modem in the current service based on the interference SNR and the SNR threshold of the received signal in the current service; and a second obtaining sub-module, configured to obtain the frequency error threshold of the received signal in the current service based on the SNR corresponding to the frequency error capable of being tolerable by the modem in the current service.

10. The apparatus for adjusting the frequency error of the terminal according to claim 9, wherein the apparatus further comprises:

a relationship table generating module, configured to obtain the simulation SNR and the frequency error threshold of the received signal when all the modems execute the predetermined services in corresponding communication standards based on a system simulation, and thus obtaining a corresponding relationship table of the simulation SNR and the frequency error threshold;

wherein the simulation SNR obtaining sub-module is further configured to query the corresponding relationship table based on the frequency error to obtain the simulation SNR corresponding to the frequency error; and the second obtaining sub-module is further configured to query the corresponding relationship table based on the SNR corresponding to the frequency error capable of being tolerable by the modem in the current service, to obtain the frequency error threshold corresponding to the SNR corresponding to the frequency error capable of being tolerable by the modem in the current service as the frequency error threshold of the received signal.

11. The apparatus for adjusting the frequency error of the terminal according to claim 8, wherein the interference SNR of the received signal is obtained by the following equation:

$$\frac{1}{SNR_{interfrence}} + \frac{1}{SNR_{FE}} = \frac{1}{SNR_{real}}$$

wherein $SNR_{interfrence}$ is the interference SNR, $SNR_{FE}$ is the simulation SNR, and $SNR_{real}$ is the real SNR.

12. The apparatus for adjusting the frequency error of the terminal according to claim 8, wherein the SNR corresponding to the frequency error capable of being tolerable by the modem in the current service is obtained by the following equation:

$$\frac{1}{SNR_{interfrence}} + \frac{1}{SNR_{FE\_required}} = \frac{1}{SNR_{target}}$$

wherein $SNR_{interfrence}$ is the interference SNR, $SNR_{FE\_required}$ is the SNR corresponding to the frequency error capable of being tolerable by the modem in the current service, and the $SNR_{target}$ is the SNR threshold of the received signal in the current service.

13. The apparatus for adjusting the frequency error of the terminal according to claim 8, wherein the synthesized adjusted value of the clock source is obtained by the following equation:

$$ADJ_i = \left\{ \frac{-\Delta f_p - \Delta f_i}{R_i}, \frac{\Delta f_p - \Delta f_i}{R_i} \right\} = \{g, h\}$$

$$Average_i = \frac{g+h}{2}$$

$$ADJ_{value} = \alpha_1 \times Average_1 + \ldots \alpha_i \times Average_i + \ldots + \alpha_n Average_n$$

wherein $ADJ_i$ is a range of the adjusted value of the clock source corresponding to the ith modem, $\Delta f_i$ is the frequency error of the received signal of the ith modem, $(-\Delta f_p, \Delta f_p)$ is the frequency error threshold of the received signal of the ith modem, $Average_i$ is the adjusted value of the clock source corresponding to the ith modem, $R_i$ is a frequency ratio between the carrier frequency of the received signal and the frequency of clock source of the ith modem, $ADJ_{value}$ is the synthesized adjusted value of the source clock, $\alpha_i$ is a weight corresponding to the ith modem, and $\alpha_i$ is greater than 0 and less than 1, $\alpha_1 + \ldots + a_i + \ldots + a_n = 1$, and n is the number of the modems.

14. The apparatus for adjusting the frequency error of the terminal according to claim 8, wherein the frequency adjusting module comprises:

a first adjusting sub-module, configured to adjust the frequency of the clock source by using the synthesized adjusted value of the clock source when the synthesized adjusted value of the clock source falls in the range of the adjusted values of the clock source corresponding to all the modems;

a second adjusting sub-module, configured to perform the following operations when the synthesized adjusted value of the clock source does not fall in the range of the adjusted values of the clock source corresponding to all the modems:

the second adjusting sub-module, configured to adjust the frequency of the clock source based on the frequency error threshold of the modem being in service when one of the modems is in service and the other modems are not in service;

the second adjusting sub-module, configured to adjust the frequency of the clock source based on the frequency error threshold of the modem being in CS service when one of the modems is in CS service and the other modems are in PS service or not in service;

the second adjusting sub-module, configured to adjust the frequency of the clock source based on the frequency error threshold of the modem selected by a user when all the modems are in CS service or PS service.

15. A mobile communication terminal, wherein the mobile communication terminal comprises the apparatus for adjusting the frequency error of the terminal according to claim 8.

16. A non-transitory computer readable storage medium storing executable codes which, when executed by a computer, make the computer perform the method for adjusting the frequency error of the terminal according to claim 1.

* * * * *